United States Patent [19]

Antkowiak et al.

[11] 4,357,458

[45] Nov. 2, 1982

[54] PROCESS FOR PREPARING POLYPHOSPHAZENE POLYMERS CONTAINING FLUOROALKOXY AND/OR ARYLOXY SUBSTITUENTS

[75] Inventors: Thomas A. Antkowiak, Rittman; David J. Serbin, Akron, both of Ohio

[73] Assignee: The Firestone Tire & Rubber Company, Akron, Ohio

[21] Appl. No.: 203,097

[22] Filed: Nov. 3, 1980

[51] Int. Cl.$^3$ .............................................. C08G 79/04
[52] U.S. Cl. .................................. 528/167; 525/538; 526/204; 526/313; 528/169; 528/212; 528/214; 528/398; 528/399; 528/400; 528/401; 528/402
[58] Field of Search ............... 528/401, 212, 214, 167, 528/169, 398, 400, 399, 402; 525/538; 526/313, 204

[56] References Cited

U.S. PATENT DOCUMENTS

| 3,271,330 | 9/1966 | Evans | 525/538 |
| 3,515,688 | 6/1970 | Rose | 525/538 |
| 4,053,456 | 10/1977 | Dieck et al. | 525/538 |
| 4,117,041 | 9/1978 | Guschl | 260/927 N |

OTHER PUBLICATIONS

Journal of the American Chemical Society 98:14, Jul. 7, 1976, pp. 4143-4149, Allcock et al.
Journal of Chemical and Engineering Data, vol. 11, No. 2, Apr. 1966, pp. 221-228, Lederle et al.
Inorganic Chemistry, vol. 5, No. 12, Dec. 1966, pp. 2239-2240, Kober et al.

Primary Examiner—Harold D. Anderson

[57] ABSTRACT

A process for preparing polyphosphazene polymers containing fluoroalkoxy and/or aryloxy substituents is provided. The process involves the reaction of a fluoroaliphatic alcohol or a substituted or unsubstituted aromatic alcohol or mixture of such alcohols with sodium hydroxide in an organic solvent or mixture of organic solvents which under appropriate conditions will form an azeotrope with water produced by the reaction. Water produced by the reaction is removed from the reaction mixture by azeotropic distillation thereby producing substantially dry sodium salts of said alcohols. The substantially dry sodium salts of the alcohols are then reacted with a linear polydichlorophosphazene polymer to produce polyphosphazene polymers containing fluoroalkoxy and/or aryloxy substituents.

11 Claims, No Drawings

PROCESS FOR PREPARING POLYPHOSPHAZENE POLYMERS CONTAINING FLUOROALKOXY AND/OR ARYLOXY SUBSTITUENTS

BACKGROUND OF THE INVENTION

The invention relates to a process for preparing polyphosphazene polymers containing fluoroalkoxy and/or aryloxy substituents. More particularly, the invention relates to an improved method for preparing substantially dry sodium salts of the alcohols employed in the preparation of such polyphosphazene polymers.

Polyphosphazene polymers containing various alkoxy and/or aryloxy groups are well known in the prior art as illustrated, for example, by U.S. Pat. Nos. 3,515,688; 3,700,629; 3,702,833; 3,838,073; 3,853,974; 3,856,712; 3,856,713; 3,888,800; 4,055,523 and 4,076,658. Such polymers have been conventionally prepared in the prior art by a two-step process which involves preparing the alkali metal salt of the desired aliphatic or aromatic alcohol (i.e., the alkali metal alcoholates) and then subsequently reacting the alkali metal salt with a linear polydichlorophosphazene polymer. The reaction scheme utilizing sodium as the alkali metal can be illustrated as follows:

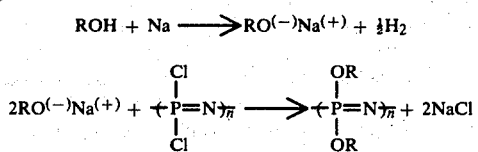

In the above reaction scheme, R may be a substituted or unsubstituted alkyl or aryl group and n is an integer of from 20 to 50,000 or more. Step 2 in the above reaction scheme is commonly referred to in the polyphosphazene art as a "derivatization" reaction.

The above process is advantageous in many respects and has permitted the preparation of polyphosphazene polymers containing a wide variety of substituted and unsubstituted alkoxy and/or aryloxy substituents as illustrated by the above-mentioned patents. However, the process nevertheless exhibits a number of serious disadvantages. Thus, as will be evident, the use of metallic sodium leads to difficult handling problems and requires rigorous exclusion of moisture from the reaction system. In addition, the use of metallic sodium is proscribed in cases where it is desired to employ polyfunctional alcohols in the reaction such as polyols, amino-alcohols, hydroxyacids, etc. due to uncontrollable side reactions. In fact, it has been found that the use of a halogenated aromatic alcohol such as p-chlorophenol in the reaction can result in the reduction of a portion of the p-chlorophenol to phenol thereby resulting in the production of an impure polymer. Moreover, since metallic sodium is hygroscopic in nature, the salt often contains small amounts of water despite efforts to exclude moisture from the system. As is well known in the polyphosphazene art, the presence of water in the reaction between the salt and the linear polydichlorophosphazene polymer should be avoided since its presence can lead to hydrolysis of a portion of the polydichlorophosphazene and even to possible gellation of the finished polyphosphazene polymer.

In addition to the aforementioned prior art relating to the use of alkali metals in the preparation of polyphosphazene polymers, certain prior art publications and patents disclose the use of alkali metal hydrides and alkali metal hydroxides including sodium hydroxide in the derivatization of cyclic chlorophosphazene oligomers.

Thus, the article entitled "Reaction of Phosphonitrilic Chloride With p-Nitrophenol" by Kober et al, Vol. 5, No. 12, Inorganic Chemistry (1966) describes the single stage reaction of the cyclic trimer $(NPCl_2)_3$, p-nitrophenol and potassium hydroxide with water removal accomplished during the reaction. The article entitled "Fluoroalkyl Phosphonitrilates, A New Class of Potential Fire-Resistant Hydraulic Fluids and Lubricants" by Lederle et al, Journal of Chemical and Engineering Data, Vol. 11, No. 2, pages 221-228 describes the preparation of cyclic fluoroalkyl phosphonitrilates by a single stage reaction of the cyclic trimer $(NPCl_2)_3$ or tetramer $(NPCl_2)_4$ with a fluoroalcohol and sodium hydride or potassium hydroxide. The water resulting from the reaction was again removed during the reaction. The article entitled "Substituent Exchange and Carbon-Oxygen Bond Cleavage with Aryloxycyclophosphazenes" by H. R. Allcock et al, Journal of The American Chemical Society, 98:14 pages 4143-4149, July 7, 1976 discloses the ligand exchange reaction between aryloxycyclo phosphazenes and sodium p-nitrophenoxide prepared by reaction of p-nitrophenol and potassium hydroxide.

U.S. Pat. Nos. 3,453,235 and 3,459,838 to Klender as well as U.S. Pat. No. 4,117,041 to Guschl also describe the derivatization of cyclic chlorophosphazene oligomers by the reaction of such oligomers with alkali metal alcoholates prepared by reaction of alkali metals, alkali metal hydrides and alkali metal hydroxides. Thus, U.S. Pat. No. 3,453,235 to Klender at column 4, lines 21-32 discloses the use of metal hydroxides in the formation of the salts while U.S. Pat. No. 4,117,041 to Guschl in Example 1 shows the preparation of alkali metal alcoholates prepared by reacting various alcohols with potassium hydroxide.

In addition to the foregoing, U.S. Pat. No. 1,910,331 to Gesellschaft generally describes the preparation of alkali metal aliphatic monohydroxy alcoholates by reaction of an alcohol with an alkali metal hydroxide in which water formed by the reaction is removed by azeotropic distillation.

It should be noted that a portion of the alcohol utilized in forming the alcoholate in this patent is employed to effect azeotropic distillation. In contrast, the present invention utilizes a separate solvent or solvent mixture to form the azeotrope with water.

As will be evident from the above prior art, certain of the individual features of the process of the present invention are known in the prior art. However, the prior art described above does not appear to disclose a total process for preparing high molecular weight linear polyphosphazene polymers containing alkoxy and/or aryloxy substituents in which all of these features are combined.

SUMMARY OF THE INVENTION

In accordance with the present invention, an improved process is provided for preparing polyphosphazene polymers containing fluoroalkoxy and/or aryloxy substituents. The process involves reacting a fluoroaliphatic alcohol or a substituted or unsubstituted aromatic alcohol or mixture of such alcohols in an organic solvent or mixture of organic solvents which will form an azeotropic mixture with water produced by the reaction, removing the water produced by the reaction by azeotropic distillation to produce substantially dry sodium salts of the alcohols and then reacting the substantially dry sodium salts with a linear polydichlorophosphazene polymer represented by the formula (NPCl₂)ₙ in which n is from 20 to 50,000.

In the process, the organic solvent and water vapors produced by azeotropic distillation are condensed and then the resultant distillate consisting of organic solvent and water is subjected to a separation procedure involving either passing the distillate through an azeotrope trap wherein the water and organic solvent are separated and the organic solvent is returned to the reaction zone or passing the distillate through a bed of molecular sieves where the same result is accomplished or a combination of such separation procedures is employed.

DETAILED DESCRIPTION OF THE INVENTION

Polyphosphazene polymers which may be produced by the process of the invention contain from 20 to 50,000 units represented by the formulae:

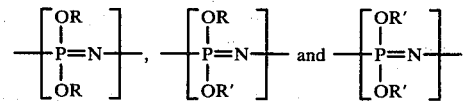

wherein R and R' are the same or different and are organic radicals selected from the group consisting of fluoroalkyl groups or substituted or unsubstituted aryl groups.

In the above formulae, when R and R' represent different groups, the R groups are fluoroalkyl groups and the R' groups are substituted or unsubstituted aryl groups. In addition, the R groups may be mixtures of different fluoroalkyl groups and the R' groups may be mixtures of different aryl groups. Thus, polyphosphazene polymers produced by the process of the invention may be homopolymers, copolymers, terpolymers, etc. Hence, the term "polymer" or "polymers" as employed throughout the specification and claims is utilized in the broad sense and includes homopolymers, copolymers, terpolymers, etc.

As will be evident from the above formulae, in cases where R is a fluoroalkyl group, the radical —OR represents a fluoroalkoxy group whereas when R' is an aryl group (substituted or unsubstituted), the radical —OR' represents an aryloxy group.

Polyphosphazene polymers produced by the process of this invention may contain any of the fluoroalkoxy and/or aryloxy groups incorporated into polyphosphazene polymers by prior art derivatization processes in which derivatization is accomplished by reacting an alkali metal salt of a fluoroaliphatic alcohol or aromatic alcohol or mixture of such alcohols with a linear high molecular weight polydichlorophosphazene polymer.

The fluoroalkoxy groups may be derived from fluoroaliphatic alcohols, especially those represented by the formula $Z(CF_2)_nOH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol, 2,2,3,3-tetrafluoropropanol, 2,2,3,3,4,4,5,5-octafluoropentanol, 2,2,3,3,4,4,5,5,6,6,7,7-dodecafluoroheptanol and the like. Additionally, the fluoroaliphatic alcohol may be a mixture of telomer alcohols represented by the formula $HCF_2—(CF_2)_x—CH_2OH$ wherein X is 1, 3, 5, 7 and 9. In instances where it is desired to incorporate mixed —OR substituent groups in the polymers, mixtures of the foregoing fluoroalcohols may be employed.

The aryloxy groups (substituted or unsubstituted) may be derived from saturated aromatic alcohols including among others phenol, alkylphenols such as cresols, xylenols, p-, o-, and m-ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy)phenol and the like, or from unsaturated aromatic alcohols such as vinylphenols, allylphenols, eugenol, isoeugenol and the like. In instances where it is desired to incorporate mixed —OR' substituent groups in the polymers, mixtures of the foregoing alcohols may be employed.

As indicated heretofore, the first step in the process of the invention involves reacting a fluoroaliphatic alcohol or substituted or unsubstituted aromatic alcohol or mixture of such alcohols of the type described above with sodium hydroxide in an organic solvent or mixture of organic solvents which will form an azeotrope or azeotropic mixture with water which is produced by the reaction.

Organic solvents or solvent mixtures which may suitably be employed include in general any solvent or solvent mixtures which will form azeotropic mixtures with water but which will not react with the fluoroaliphatic alcohols or aromatic alcohols, the sodium hydroxide or the polydichlorophosphazene polymer utilized in the process. In instances where a single organic solvent is employed, the preferred solvent is an ether type solvent such as tetrahydrofuran or monoglyme. In instances, where a mixture of organic solvents is employed, the preferred mixture is a mixture of an ether type solvent such as those described above and an aliphatic hydrocarbon solvent such as hexane, cyclohexane, and the like. An especially preferred organic solvent mixture is a mixture of tetrahydrofuran and cyclohexane. In this mixture, the ratio of tetrahydrofuran to cyclohexane is important if effective water removal is to be obtained. Thus, the ratio of tetrahydrofuran to cyclohexane should be 1:1.4 for most effective water removal.

It should be noted here that the first step of the reaction depending upon the nature of the specific fluoroalcohols or aromatic alcohols employed can often be carried out at room temperature. However, it is usually desirable and often preferred to carry out the first step of the reaction by heating the reaction mixture in order to facilitate the speed of the reaction. The specific temperature at which the reaction is carried out will depend upon the specific alcohol or alcohols and the specific organic solvent or solvents employed in the reaction. In general, it is sufficient to merely heat the reaction mixture to reflux temperatures.

The second step of the reaction involves removing the water produced by the reaction from the reaction mixture by the technique of azeotropic distillation in order to produce substantially dry sodium salts of the alcohol or alcohols.

The term "substantially dry" as applied to the sodium salts herein (i.e., sodium alcoholates) and used throughout the specification and claims refers to sodium salts containing less than about 100 ppm of water.

The azeotropic distillation procedure can be accomplished by heating the reaction mixture to reflux to produce a mixture of organic solvent vapors and water vapors and then to pass the mixture of vapors from the reaction zone to a condenser wherein the vapors are condensed to form a liquid distillate consisting of organic solvent and water. In cases where the distillate is heterogeneous and separates into organic solvent and water phases, the distillate can be passed to an azeotrope trap where the organic solvent phase can be returned to the reaction zone and the water phase removed from the system. In cases where the distillate is homogeneous, the organic solvent and water can be separated by passing the distillate through a bed of molecular sieves wherein the water is collected and the organic solvent is returned to the reaction zone. A combination of such separation procedures can be appropriately utilized if desired to affect more complete water removal.

The final step in the process of the invention involves reacting the substantially dry sodium salts produced by the second step of the reaction with a linear polydichlorophosphazene polymer represented by the formula $(NPCl_2)_n$ in which n is from 20 to 50,000.

The following examples are submitted for the purpose of further illustrating the nature of the present invention and are not intended as a limitation on the scope thereof. Parts and percentages referred to in the examples are by weight unless otherwise indicated.

EXAMPLE 1

To a 3-liter, 3-necked flask equipped with a stirrer, a condenser and a nitrogen purge was charged 125 grams (1.25 moles) of trifluoroethanol, 150 grams (0.8 mole) of a mixture of telomer alcohols represented by the formula $[HCF_2\text{-}(CF_2)_x CH_2OH]$ wherein $x=1,3,5,7,9$, 6.7 grams of o-allylphenol, and 1000 milliliters (ml) of tetrahydrofuran (hereinafter THF). Then, 80.0 grams (2 moles) of sodium hydroxide pellets were added to the flask. The reaction mixture was stirred at reflux for 1.5 hours at which time most of the sodium hydroxide had reacted. After cooling the reaction mixture, the flask was equipped with a 10″ fractionating column packed with glass rings and an azeotrope trap. Then, 1140 ml. of cyclohexane were added to the flask. Following this addition, heat was applied with stirring to effect refluxing with the azeotrope collecting in the trap. The resultant distillate formed two phases, i.e., an upper phase of cyclohexane/THF and a lower phase of water. The water was then removed from the bottom of the trap and the upper phase of cyclohexane/THF was returned to the reaction flask. After 36 hours of refluxing and removal of a portion of the solvent mixture, the amount of water in the alkoxide/aryloxide mixture was found to be 58 parts per million (hereinafter PPM) by Karl Fischer titration.

Following this procedure, 432 grams [0.948 millimoles (mM)] of the alkoxide/aryloxide solution was added to a 3-liter, 3-necked flask equipped with a stirrer, condenser, rubber septum and a nitrogen purge system. Then, a chloropolymer solution consisting of 50 grams of chloropolymer in cyclohexane, said solution occupying a total volume of 650 ml. and said chloropolymer having a Dilute Solution Viscosity (DSV) in cyclohexane of 0.95, was pressurized into the flask containing the stirred alkoxide/aryloxide solution. This addition which was effected through the rubber septum using nitrogen pressure required 0.5 hour to complete. Following the addition, the reaction mixture was refluxed for 6.5 hours, cooled and stirred overnight at room temperature. Then, the polymer which precipitated from the reaction mixture was gravity filtered through cellulose-rayon filter paper. After this, the polymer-sodium chloride mixture was added to about 2 gallons of hot water maintained at 80°–95° C. by a steam line. The polymer was then vigorously agitated for 15 minutes in the steam bath. The polymer was again recovered by filtration and rinsed with distilled water until the rinse water showed no evidence of chloride ion as determined by a silver nitrate test. Following this step, the polymer was dried under vacuum at 55°–60° to produce 125.4 grams of a nearly white elastomeric polymer.

An analysis of the elastomeric polymer showed the following properties:
DSV in acetone = 1.61
% gel = 0
% Na = 0.11
% Cl = 0.17

EXAMPLE 2

To a 3-liter, 3-necked flask equipped with a stirrer, a condenser and a nitrogen purge was charged 134.4 grams (1.344 moles) of trifluoroethanol, 149.0 grams (0.693 mole) of a mixture of telomer alcohols represented by the formula $[HCF_2\text{-}(CF_2)_x CH_2OH]$ wherein $x=1,3,5,7,9$, 8.4 grams of o-allylphenol and 770 ml of THF. Then, 80.0 grams (2 moles) of sodium hydroxide pellets were added to the flask. The reaction mixture was stirred at reflux temperature under nitrogen for 1 hour at which time most of the sodium hydroxide had reacted. After cooling the reaction mixture, the flask was equipped with a 10″ fractionating column packed with glass rings and an azeotrope trap. Then, 1230 ml of cyclohexane were added to the flask. Following this addition, the reaction mixture was heated to reflux with stirring. After 12 hours of refluxing, 39 ml of water had been removed from the reaction mixture. The fractionating column and azeotrope trap were then replaced with a Soxhlet extractor filled with molecular sieves. The reaction mixture was again heated to reflux and refluxing was continued for 23.5 hours with the distillate being passed through the molecular sieves. Following this procedure, the alkoxide/aryloxide mixture was analyzed for water by Karl Fischer analysis. Two titrations showed 0 and 15 ppm of water respectively.

Following the above procedure, 1.088 moles of the alkoxide/aryloxide solution was added to a 3-liter, 3-necked flask equipped with a stirrer, condenser, rubber septum and a nitrogen purge system. Then a chloropolymer solution (55 grams of chloropolymer in 650 ml. of toluene) was added to the stirred alkoxide/aryloxide solution while under constant nitrogen purge. The addition required 40 minutes. Following this addition, the reaction mixture was refluxed for 6.75 hours and then cooled and stirred overnight at room temperature. At this point, the agitation was discontinued and the polymer precipitated from the reaction medium. Then, the mother liquor was removed from the flask by decanting. The polymer-sodium chloride mixture was added slowly to hot water (i.e., 80°–95° C.) heated by steam and agitated vigorously. After all the polymer-sodium chloride mixture was added to the hot water, heating was continued for an additional 15 minutes. The polymer was then washed under tap water and distilled water until the wash water showed no free chloride ion as determined by the silver nitrate test. The polymer was then dried under vacuum at 60° C. to produce 130.3 grams of an off-white elastomer.

EXAMPLE 3

To a 3-liter, 3-necked flask equipped with a magnetic stirrer, fractionating column packed with glass rings, condenser, azeotrope trap and a nitrogen purge was charged 150.0 grams (1 mole) of 4-t-butylphenol and 154.0 grams (1.2 moles) of 4-chlorophenol in a solvent mixture consisting of 500 ml of THF and 800 ml of cyclohexane. Then, 80.0 grams (2 moles) of sodium hydroxide were added to the flask. The mixture was then stirred for 20 minutes with gentle heating (30 variac setting) being applied to the flask. At this point, essentially all of the sodium hydroxide had reacted. Following this procedure, heating was increased to effect refluxing. After 21 hours of refluxing, the sodium aryloxide solution was analyzed for water content by Karl Fischer titration. The analysis of the aryloxide solution by this procedure showed a water content of 22 ppm.

The resultant aryloxide solution is then reacted with the chloropolymer to produce a polyphosphazene polymer containing 4-t-butylphenoxide and 4-chlorophenoxide substituents using a procedure substantially similar to the procedures described in Examples 1 and 2.

EXAMPLE 4

To a 3-necked flask equipped with a magnetic stirrer, fractionating column packed with glass rings, azeotrope trap, condenser and a nitrogen purge was charged 80.0 grams (2 moles) of sodium hydroxide, 139.0 grams (1.39 moles) of trifluoroethanol, 148.4 grams (0.71 moles) of $C_3f$-$C_{11}f$ telomeric fluoroalcohols, 770 ml of THF and 1230 ml of cyclohexane. The mixture was heated rapidly to reflux. Refluxing and collection of the water-rich lower phase of the azeotrope was continued for about 27 hours. Following this procedure, the reaction mixture was cooled and the fractionating column and azeotrope trap were replaced by a Soxhlet extractor filled with molecular sieves. The mixture was then again heated to reflux and refluxing through the molecular sieve was continued for about 23 hours.

An analysis of the resultant alkoxide solution by Karl Fischer titration showed it to have a water content of 79 ppm.

The resultant aryloxide solution is then reacted with the chloropolymer to produce a polyphosphazene polymer containing fluoroalkoxide substituents using a procedure substantially similar to that of Example 1.

The following Examples (Example A and Example 5) illustrate a comparative evaluation in which a polyphosphazene polymer produced by a process of the prior art (Example A) is compared with a polyphosphazene polymer produced by the process of the invention (Example 5).

EXAMPLE A

In this example, an attempt was made to produce a polyphosphazene polymer utilizing the following one-step reaction:

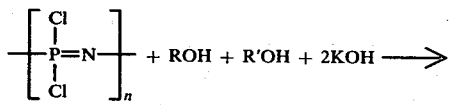 + ROH + R'OH + 2KOH ⟶

-continued

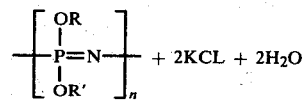 + 2KCL + 2H$_2$O (DSV of chloropolymer was 1.88; R=CH$_2$CF$_3$ and R'=CH$_2$(CF$_2$)$_3$CF$_2$H)

In the above reaction, the water was not removed until after the chloropolymer had been added.

The reaction was carried out using the following procedure:

0.103 Moles of each of the alcohols and 50 ml of benzene were added to a 500 ml 3-necked flask equipped with a dropping funnel, stirrer, condenser and an azeotrope trap. 0.136 Moles of powdered KOH were added to the mixture and vigorous agitation was begun. The mixture was stirred for 30 minutes. At this time, no azeotrope was collected in the trap although an exotherm was noted. 0.0156 Moles of the chloropolymer in benzene was then added over a 30 minute period. Following the addition, a considerable amount of a white precipitate formed. The reaction mixture was then refluxed for a period of 4 hours. After cooling the mixture to room temperature and discontinuing the agitation, the liquid phase was decanted. The resultant polymer solid was squeezed under hot tap water to produce an elastomeric polymer. After drying at 55° C. in a vacuum oven the elastomer weighed 16.2 grams. An analysis of the elastomer product showed that it had a DSV of 8.39, which was unusually high.

The thermal stability of the elastomer product was determined by aging at 300° F. and then measuring DSV. Results were as follows:

| Days at 300° F. | DSV |
|---|---|
| 0 | 8.39 |
| 1 | 2.37 |
| 3 | 0.68 |
| 6 | 0.30 |

The above results indicate rapid thermal degradation of the elastomer and hence that the polymer had poor thermal stability.

EXAMPLE 5

A mixture of fluoroalkoxides and o-allylphenoxides was prepared by reacting sodium hydroxide with an excess (5%) of fluoroalcohols (66% trifluoroethanol and 34% of the mixed telomer fluoroalcohols used in Example 1) and o-allylphenol. Water formed by the reaction was reduced to about 2000 ppm using the azeotropic distillation procedure set forth in Example 1. Then, the alkoxides and o-allylphenoxide were dried to abut 0 ppm water and by cycling the solution through a column packed with molecular sieves.

Following this procedure, 1500 ml. of the solution containing 1.48 moles of the alkoxides and 0.03 mole of o-allylphenoxide were reacted with 80 grams of (NPCl$_2$)$_n$ in cyclohexane (679 grams) with agitation and under nitrogen purge. Sufficient THF was then added to the reaction mixture to maintain a cyclohexane to THF ratio of 0.75. This resulted in the finished product being soluble in the reaction solvent. The reaction was completed by refluxing for 6.5 hours. After cooling, the reaction mixture was treated with CO₂ and 75 ml of aqueous sodium bromide solution (10 weight %) to produce a pH of 8. The reaction mixture was then centrifuged to remove most of the NaCl. The mother liquor was then added to a steam bath (80°–95° C.) to remove all of the NaCl and solvents. Drying of the resultant polymer solid under vacuum at 60° C. produced a white elastomer having a DSV in acetone of 2.25.

The thermal stability of the elastomer was determined by aging at 300° F. and then measuring DSV. Results were as follows:

| Days at 300° F. | DSV |
|---|---|
| 0 | 2.25 |
| 1 | 1.73 |
| 2 | 1.67 |
| 4 | 1.71 |
| 11 | 1.13 |

The above results when compared to the results of Example A indicate that the process of this invention produces polyphosphazene polymers having much greater thermal stability.

We claim:

1. A method of preparing polyphosphazene polymers containing from 20 to 50,000 units represented by the formulae:

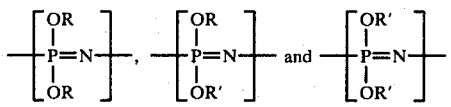

wherein R and R' are the same or different and are organic radicals selected from the group consisting of fluoroalkyl groups and substituted or unsubstituted aryl groups, said method comprising the steps of:
   (a) reacting a fluoroaliphatic alcohol or substituted or unsubstituted aromatic alcohol or mixture of said alcohols with sodium hydroxide in an organic solvent or mixture of organic solvents which will form an azeotrope with water produced by the reaction;
   (b) removing water produced by the reaction of said alcohols or mixture of alcohols and said sodium hydroxide from the reaction zone by azeotropic distillation thereby producing substantially dry sodium salts of said alcohols; and
   (c) reacting said substantially dry sodium salts of said alcohols with a linear polydichlorophosphazene polymer represented by the formula (NPCl₂)ₙ, in which n is from 20 to 50,000.

2. The method of claim 1 wherein said alcohol is selected from the group consisting of trifluoroethanol; telomeric fluoroalcohols represented by the formula [HCF₂—(CF₂)ₓCH₂OH], in which x is 1,3,5,7,9; o-allylphenol; 4-t-butylphenol; 4-chlorophenol; 2,4-dichlorophenol and mixtures thereof.

3. The method of claim 1 wherein said organic solvent is tetrahydrofuran.

4. The method of claim 1 wherein said mixture of organic solvents is a mixture of an ether-type solvent selected from the group consisting of tetrahydrofuran and monoglyme; and an aliphatic hydrocarbon solvent selected from the group consisting of hexane and cyclohexane.

5. The method of claim 4 wherein said mixture of organic solvents is a mixture of tetrahydrofuran and cyclohexane and the ratio of tetrahydrofuran to cyclohexane is 1:1.4.

6. The method of claim 1 wherein said azeotropic distillation is effected by heating the reaction mixture to reflux to produce an azeotropic mixture consisting of organic solvent vapors and water vapors and then passing said vapors out of the reaction zone.

7. The method of claim 6 further comprising the step of condensing the mixture of vapors passed from the reaction zone to produce a liquid distillate consisting of organic solvent and water.

8. The method of claim 7 further comprising the step of separating the organic solvent component from the water component of said distillate.

9. The method of claim 8 wherein the separation of the water component from the organic solvent component of the distillate is accomplished by passing the distillate to an azeotrope trap wherein the water is removed from the distillate and the organic solvent is returned to the reaction zone.

10. The method of claim 8 wherein the separation is accomplished by passing the distillate through a bed of molecular sieves wherein the water is removed from the distillate and the organic solvent is then returned to the reaction zone.

11. The method of claim 8 wherein the separation is accomplished by first passing the distillate through an azeotrope trap and then subsequently passing the distillate through a bed of molecular sieves.

* * * * *

UNITED STATES PATENT AND TRADEMARK OFFICE
CERTIFICATE OF CORRECTION

PATENT NO. : 4,357,458
DATED : November 2, 1982
INVENTOR(S) : Thomas A. Antkowiak and David J. Serbin It is certified that error appears in the above-identified patent and that said Letters Patent are hereby corrected as shown below:

Column 7, line 30

"To a 3-necked flask" should read

-- To a 3-liter, 3-necked flask --

Signed and Sealed this

Fifth Day of April 1983

[SEAL]

Attest:

GERALD J. MOSSINGHOFF

*Attesting Officer*  *Commissioner of Patents and Trademarks*